G. H. Cross,
Bread Machine,
No. 65,649.    Patented June 11, 1867.

Witnesses.
Theo Tusche
Wm Trewin

Inventor.
G H Cross.
Per Munn & Co
Attorneys

United States Patent Office.

GEORGE H. CROSS, OF MONTPELIER, VERMONT.

Letters Patent No. 65,649, dated June 11, 1867.

---

IMPROVED ROTARY DOUGH-DRESSER.

---

The Schedule referred to in these Letters Patent and making part of the same.

---

TO ALL WHOM IT MAY CONCERN:

Be it known that I, G. H. CROSS, of Montpelier, in the county of Washington, and State of Vermont, have invented a new and improved Rotary Dough-Dresser; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
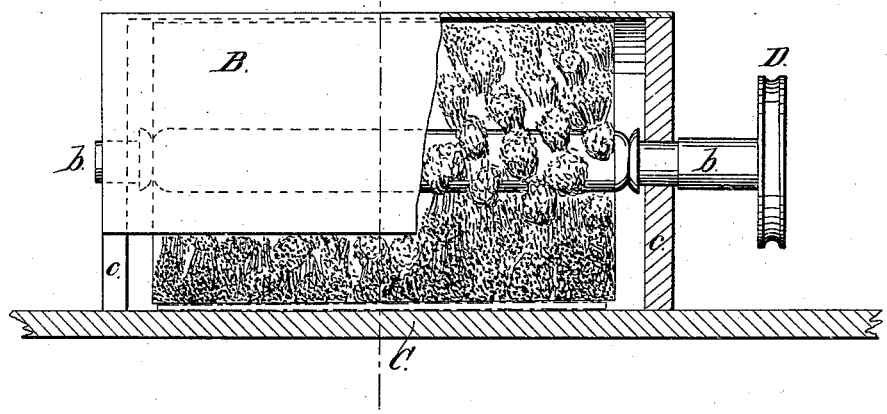
Figure 1 is a side view of my improved rotary brush for dressing dough.
Figure 2:
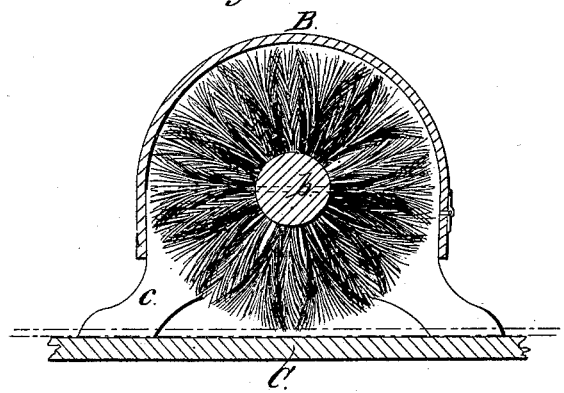
Figure 2 is an end view.

The object of this invention is to perform what is technically called by cracker-bakers "dressing the dough," or brushing off the flour from the surface of the sheet of dough after it comes from the rollers on its way to the stamping machine to be cut up into crackers. It is customary to dress the dough with an ordinary counter brush by hand; and my improvement consists in applying for this purpose a rotary brush operated by power in connection with the cracker machinery, whereby the work of dressing is accomplished much better, giving smoother surface and higher finish to the dough, and saving the labor of one workman to every machine. The improvement is very simple in the nature and arrangement of the device, but it introduces an important economy in the manufacture of a staple article of food, and improves the preparation of it so as to render it more attractive to the eye. For these reasons, simple as the device may appear, it combines utility with novelty in its application.

A represents a large circular brush made of stiff bristles, which is as long as may be required to extend across a sheet of dough passing from a set of rollers into a cracker-cutting machine. The centre stock or shaft of the brush projects at each end to form a shaft, $b\ b$, which is hung in the ends $c\ c$ of a box, B, which covers the brush and reaches nearly to the lower side of it. The box B is set upon a table or stand, C, which is to be placed between the rollers and the cracker-cutters to allow the sheet of dough, as exhibited in red lines, to pass under the brush to the cutters. On one end of the shaft $b\ b$ is a pulley, D, which is connected by a belt with the shafting of the cracker machine to give the brush a rotary motion upon and in contact with the dough, by which the flour is thoroughly removed and the surface dressed to a smooth and polished finish, fitting it to make crackers of superior appearance.

Having thus described my invention, I claim as new, and desire to secure by Letters Patent, as follows:

The revolving brush A upon the shaft $b\ b$, in combination with the box B, adapted for dressing dough to prepare it for the manufacture of crackers, as herein shown and described.

G. H. CROSS.

Witnesses:
 ISAAC M. WRIGHT,
 EDWARD P. RICHARDSON